United States Patent [19]

Wollen

[11] 4,074,014

[45] Feb. 14, 1978

[54] ARTICLE INCLUDING ACRYLIC ADHESIVE BONDING VINYL COATINGS TO POLYMERIC SUBSTRATES

[75] Inventor: Carl H. Wollen, Comstock Park, Mich.

[73] Assignee: Leon Chemical & Plastics, Division of U.S. Industries, Inc., Grand Rapids, Mich.

[21] Appl. No.: 646,948

[22] Filed: Jan. 6, 1976

Related U.S. Application Data

[63] Continuation of Ser. No. 412,669, Nov. 5, 1973, abandoned.

[51] Int. Cl.$^2$ .............................................. B32B 27/08
[52] U.S. Cl. .................................... 428/506; 428/522; 428/524; 428/523; 427/407 E; 260/844; 156/308; 156/332; 156/310; 156/335; 156/315
[58] Field of Search ............... 428/506, 524, 522, 523; 156/308, 332, 310, 335, 315; 260/32.8 R, 33.64 A, 78.5; 427/407

[56] References Cited

U.S. PATENT DOCUMENTS

| | | | |
|---|---|---|---|
| 3,075,863 | 1/1963 | Frey | 260/32.8 R |
| 3,150,118 | 9/1964 | Clemens | 252/8.6 X |
| 3,280,217 | 10/1966 | Lader et al. | 260/844 |
| 3,331,730 | 7/1967 | Bean, Jr. et al. | 161/192 |

*Primary Examiner*—P. C. Ives
*Attorney, Agent, or Firm*—Price, Heneveld, Huizenga & Cooper

[57] ABSTRACT

The specification discloses noncracking permanent adhesives which utilize mixtures of phenolic resins and methacrylate resins having a Mw greater than about 100,000 and preferably about 400,000 bonding plasticized vinyl resin coverings, e.g., PVC, to hard polymeric substrate surfaces such as ABS, etc. Also, it is preferable that the vinyl resin covering contain plasticizers which are no more than limited in compatibility with the adhesive. It is theorized that the adhesive mixture prevents migration of plasticizer from the plasticizer-containing vinyl resin covering into the adhesive and eventually into the polymeric substrate.

19 Claims, No Drawings

ARTICLE INCLUDING ACRYLIC ADHESIVE BONDING VINYL COATINGS TO POLYMERIC SUBSTRATES

CROSS-REFERENCE TO RELATED APPLICATION

This is a continuation of application Ser. No. 412,669, filed Nov. 5, 1973, abandoned.

BACKGROUND OF THE INVENTION

Vinyl resins have been used to coat or cover a wide variety of materials. Most materials such as acrylonitrile-butadiene-styrene (hereinafter referred to as ABS) may be coated with a vinyl resin without the use of the adhesive materials simply by dipping or spraying the material being coated with the resin coating. However, vinyl resin coverings particularly on materials like ABS are likely to be nonpermanent, in that a good bond between the materials is not formed. Within a short time after coating, peeling and cracking, etc., of the polymeric surface results. Further, if the coating or covering is to be used on surfaces which are subject to frictional contact, e.g., rubbing, etc., the covering or coating slips.

Several attempts have been made to securely bond vinyl resin coverings to various materials. Systems involving preheating of the material being coated, baking of the covering, etc., have all been used with only limited success. Presently, vinyl resins which are utilized in coverings are available as dispersions or suspensions. The vinyl resin is usually in the form of a paste dispersion of elastomers in a plasticizer (plastisol) and paste dispersions of such elastomers in a plasticizer and a volatile liquid (organisols). These materials have been particularly difficult to permanently adhere to surfaces, e.g., polymeric surfaces. In the use of such systems, it has been necessary to apply the vinyl resin dispersions only after the surface to which they are being applied has been treated with a primer. Various primers, e.g., vinyl butyral wash primer, have been utilized to aid in bonding of the vinyl resin dispersion. Among several disadvantages of known primers for vinyl resin include: insufficient adherence to permit forming and stamping operations subsequent to coating; the requirement of critical preheating of surfaces and curing of primer and/or coatings; a decreased adherency with aging; and cracking and breaking of the polymeric substrate. It is theorized that the cracking of the polymeric substrate is caused to great extent by migration of the plasticizer from the cured resin dispersions through the primer into the substrate.

The prior art has attempted to alleviate these problems by use of primers comprising various mixtures of acrylic resins. One such mixture comprises acrylic and epoxy resins. Such mixtures have been useful particularly where the surface to which the vinyl dispersion is being bonded is metallic. However, such mixtures do not adequately bond vinyl resin dispersions to polymeric materials, e.g., ABS. Further, they do not eliminate cracking and breaking of polymeric substrate by plasticizer, if the vinyl resin comprises plasticizer.

SUMMARY OF THE INVENTION

In accordance with the present invention, it has been found that strong and permanent adhesives useful for bonding vinyl resin coverings to surfaces, can be made by employing mixtures of phenolic resins and methacrylate resins having a Mw greater than about 100,000, preferably about 400,000. Also, preferably, the methacrylate resin is a lower alkyl methacrylate, most preferably, a methyl methacrylate.

If the adhesive is used with vinyl resin coverings, contains plasticizer, and the plasticizer is no more than limited in compatibility with the resins, such superior bonding results, particularly on polymeric surfaces, as to show a synergistic combination.

The adhesive preferably comprises from about 1 percent to about 95 percent (all percent are by weight resin solids) phenolic resin and from about 5 percent to about 99 percent methacrylate resin, more preferably from about 50 percent to about 80 percent phenolic resin and from about 20 percent to about 50 percent methacrylate resin, and most preferably from about 60 percent to about 70 percent phenolic resin and from about 30 percent to about 40 percent methacrylate resin.

When the covering comprises plasticizer, preferably the plasticizer is no more than limited in compatibility with the resin, i.e., phthalate plasticizers.

It is theorized that the polymeric mixtures of this invention act as efficient permanent adhesives for plasticizer-containing coverings because they resist migration of the vinyl coating plasticizer.

DESCRIPTION OF THE PREFERRED EMBODIMENT

The noncracking adhesives of this invention for bonding vinyl coverings to polymeric surfaces comprise mixtures of phenolic resin and methacrylate resins.

Phenolic resins useful with this invention must be thermosetting and are obtained by the condensation of phenol or substituted phenols with aldehyde such as formaldehyde, actaledehyde, and furfural. Among phenolic resins which are particularly useful with this invention are: phenol-formaldehyde resins such as DS-9-2816 sold by Jamestown Finishes, Inc., Jamestown, N.Y.

The methacrylate resins of this invention have a Mw greater than 100,000, more preferably, about 400,000. Preferably, the methacrylate resin is a $C_1$ to $C_4$ lower alkyl, most preferably a methyl methacrylate resin.

Weight average molecular weight, Mw is defined as:

$$\overline{M}w = (\Sigma Mi\ Ni/\Sigma MiNi)$$

where Mi is the molecular weight of particles to chain length $i$, and Ni is the number of particles of chain length $i$. Since highly polymeric resins are composed of mixtures of macramolecules, the higher the Mw, the greater the number of longer chained macramolecules in the resin.

Examples of methacrylate resins which are useful with this invention include those taught by U.S. Pat. No. 3,150,118 which are $C_1$ to $C_4$ lower alkyl methacrylate/lower alkyl acrylate copolymers. An example of a particularly useful methacrylate resin having Mw about 400,000 is a copolymer of methyl methacrylate and normal or isobutyl acrylate wherein the methyl methacrylate comprises from about 40 to 75 wt. percent of the copolymer and the normal or isobutyl acrylate comprises from about 20 to about 50 wt. percent of the copolymer. A commercially available version of this resin is Acryloid 55D42 sold by Rohm and Haas Company, Philadelphia, Pa.

If plasticizers are used in the vinyl coverings used in conjunction with this invention, they may be either highly compatible (primary) or limited in compatibility (secondary) with the phenolic and methacrylate resin adhesive mixture. However, if the plasticizer utilized in the vinyl coating is no more than limited in compatibility with the resins, the adhesive mixture shows such superior bonding, i.e., craze or cracking resistance particularly on polymeric surfaces, characteristics as to show a synergistic combination. Useful plasticizers include adipate and sebacate esters, polyols, e.g., ethylene glycol and its derivatives, and caster oil. Most preferred plasticizers having no more than limited compatibility with the resins include phthalate esters, i.e., diisodecyl phthalate and/or epoxy phthalate, and those comprising metallic solids, i.e., liquid cadmium barium zinc stabilizer, sold by Argus Chemical Corp., Brooklyn, N.Y. Least preferred plasticizers having high compatibility with the resins include phosphates, i.e., trieresyl phosphate.

It is theorized that the phenolic resin either macra-scopically or molecularly sufficiently reacts within the methacrylate resin matrix actually surrounding the long chained methacrylate resin molecules, as to provide a barrier which is virtually inpenetratable by the polyvinyl plasticizers. This barrier effect is particularly noted where the plasticizer is no more than limited in compatibility with the resins.

The resins are commercially available as solutions which contain from about 1 to about 20 weight percent solids in various solvents. When applying the adhesive to the surface being covered with the vinyl resin dispersion, it is preferred that the commercially available resins after being formed into the adhesive mixture be mixed with an organic solvent. The amount of solvent utilized depends on among other things, the atmospheric temperature, pressure, and humidity. However, it is preferred that the solvent-to-adhesive mixture be between about 10:1 and 1:10 by volume, preferably the ratio is about 1:1 by volume. Though many solvents are suitable, the organic solvent used preferably comprises blends or mixtures of alkyl and aryl ketones, aromatic hydrocarbons, and alcohols. Useful alkyl ketones include methylethyl, methylisobutyl and diisobutyl ketones and diacetone alcohol. Among aromatic hydrocarbons useful with this invention are toluol and high flash naphtha. Alcohols include 2-methoxy ethynol, alkyl Cellusolve, etc.

The adhesive mixture of this invention preferably comprises from about 1 percent to about 95 percent phenolic resin, and from about 5 percent to about 99 percent methacrylate resin, more preferably, the mixture comprises from about 50 percent to about 80 percent phenolic resin, and from about 20 percent to about 50 percent methacrylate resin and most preferably the mixture comprises from about 60 percent to about 70 percent phenolic resin, and from about 30 percent to about 40 percent methacrylate resin (all percent by weight resin solids).

Various agents may be added by those skilled in the art to control adhesion kinetics, e.g., curing agents. Curing agents useful with this adhesive include poly-functional amines and acid anhydrides. Examples of poly-functional amines include diethylene triamine, trethylene tetramine, tetraethylene petamine, and phenylenediamine-meta. Examples of acid anhydrides include maleic, dichloromaleic and phthalic anhydrides.

Any of the vinyl resins are useful with this invention. Suitable vinyl covering polymers include copolymers of vinyl chloride and vinyl acetate. Examples of suitable vinyl materials include Vinylite VYHH and QYNL sold by Union Carbide and Carbon Corporation. However, as above discussed, the nature of the plasticizer contained in the resin is of great importance.

EXAMPLE 1

Adhesives are formulated by intermixing varying amounts of a phenolic resin solution, DS-9-2816 (15% solids), sold by Jamestown Finishes, Inc., Jamestown, N.Y., and a methacrylate resin, having a Mw of about 400,000 Acryloid, 55D42 (8% solids), sold by Rohm and Haas Company, Philadelphia, Pa. The adhesive is spray or dip coated on an ABS molded surface which is subsequently covered by injection molding the following material over the ABS substrate:

|  | Parts |
|---|---|
| Polyvinyl chloride reside (QYNL) | 100 |
| Diisodecyl phthalate | 91 |
| Epoxy Phthalate | 8 |
| CaCO$_3$ | 20 |
| Stearic Acid | ½ |
| BaCdZn Chelator Stabilizer | 2½ |

The composite is then tested as to the adherence of the vinyl coating to the ABS before and after aging. The adhesive strength of the resulting bond is given in pounds per inch width. The PVC covering has a Durometer rating of 70 and thus itself tears at around 50 pounds per inch of width. The following table summarizes the results of these tests:

| Parts 55D42 methacrylate resin solution (8% solids) | Parts DS-9-2816 phenolic resin solution (15% solids) | adhesive strength* in lbs./inch of width |
|---|---|---|
| 10 | 1 | 47-52 |
| 7 | 1 | 51-53 |
| 4 | 1 | 51-57 |
| 1 | 1 | 50-53 |
| 1 | 4 | 49-57 |
| 1 | 7 | 47-52 |
| 1 | 10 | 46-50 |

*In all cases, the vinyl coating tore before adhesive failed.

EXAMPLE 2

ABS Cyclolac T tensile bars coated with only methacrylate resin (55D42) and coated with a 1:2, methacrylate (55D42) to phenolic resin (DS-9-2816), adhesive mixture were strained to 0.8 percent over a 15½ inch diameter wooden drum. Various plasticizers contained in vinyl coverings are painted onto the adhesive-covered surface of the ABS until the surface crazed. The following table sets forth the results of these tests:

| Plasticizer | 55D42 methacrylate resin solution only (8% solids) | Adhesive Mixture 1:2 | |
|---|---|---|---|
| | | 55D42 methacrylate resin solution (8% solids) | DS-9-2816 phenolic resin solution (15% solids) |
| tricresyl phosphate | ½ hour | | 1 hour |
| octyl, decyl phthalate | 4 hours | | 6 hours |
| epoxy tallate | > 1 week | | > 2 weeks |
| liquid barium, cadmium, zinc stabilizer | > 1 week | | > 2 weeks |
| diisodecyl phthalate | 16 hours | | > 2 weeks |
| 8/91/2½ epoxy tallate, diisodecyl phthalate & BaCdZn chelator stabilizer | 24 hours | | > 2 weeks |

As seen in this example, the phosphate plasticizer, which is highly compatible with the adhesive resin mixture acts to penetrate the resin and attack the ABS substrate rapidly as compared to the other limited incompatibility plasticizers showing the synergisitic combination of resins and preferred plasticizers.

As various changes could be made in the above methods and products without departing from the scope of the invention, it is intended that all matter contained in the above description shall be interpreted illustrative and not in a limiting sense.

The embodiments of the invention in which an exclusive property or privilege is claimed are defined as follows.

1. An article comprising a vinyl resin covering of a material suitable for molding onto a substrate and containing plasticizer consisting of substantially only phthalate esters; a polymeric substrate of a material forming a hard substrate surface to which said vinyl resin covering is adhered and an adhesive bonding said vinyl resin covering to said polymeric substrate, said adhesive comprising a mixture of from about 1 wt. percent to about 95 wt. percent phenolic resin solids and from about 5 wt. percent to about 99 wt. percent methacrylate resin solids, said methacrylate resin having a weight average molecular weight greater than about 400,000.

2. The article of claim 1 wherein said methacrylate resin is a $C_1$ to $C_4$ lower alkyl methacrylate.

3. The article of claim 2 wherein said lower alkyl methacrylate is methyl methacrylate.

4. The article of claim 2 wherein said methacrylate resin is a $C_1$ to $C_4$ lower alkyl methacrylate/lower alkyl acrylate copolymer.

5. The article of claim 4 wherein said copolymer is a copolymer of methyl methacrylate and normal or isobutyl acrylate wherein the methyl methacrylate comprises from about 40 to about 75 wt. percent of the copolymer and the normal or isobutyl acrylate comprises from about 20 to about 50 wt. percent of the copolymer.

6. The article of claim 1 wherein said plasticizer comprises diisodecyl phthalate.

7. The article of claim 1 wherein said adhesive is comprised of a mixture of resin solutions containing from about 1 to about 20 wt. percent resin solids and is dissolved in an organic solvent before said adhesive is applied to the surface being coated with said vinyl resin coating wherein the solvent-to-adhesive mixture is between about 10:1 and 1:10 by volume.

8. The article of claim 7 wherein said solvent-to-adhesive mixture is about 1:1 by volume.

9. The article of claim 7 wherein said solvent is selected from a group comprising alkyl and aryl ketones, aromatic hydrocarbons, and alcohols.

10. The article of claim 1 wherein said adhesive includes curing agents.

11. The article of claim 10 wherein said curing agent is selected from a group comprising polyfunctional amines and acid anhydrides.

12. The article of claim 1 wherein said polymeric surface comprises rigid polyvinyl chloride.

13. The article of claim 1 wherein said polymeric surface comprises acrylonitrile-butadiene-styrene.

14. The article of claim 1 wherein said adhesive comprises a mixture of from about 50 wt. percent to about 80 wt. percent phenolic resin solids and from about 20 wt. percent to about 50 wt. percent methacrylate resin solids.

15. The article of claim 1 wherein said adhesive mixture comprises from about 60 wt. percent to about 70 wt. percent phenolic resin solids and from about 30 wt. percent to about 40 wt. percent methacrylate resin solids.

16. An article comprising a vinyl resin covering of a material suitable for molding onto a substrate and containing plasticizer consisting substantially only phthalate esters; a polymeric substrate of material forming a hard substrate surface to which said vinyl resin covering is adhered and an adhesive bonding said vinyl resin covering to said polymeric substrate, said adhesive comprising a mixture of from about 1 wt. percent to about 95 wt. percent phenolic resin solids and from about 5 wt. percent to about 99 wt. percent methacrylate resin solids, said methacrylate resin being a copolymer of methacrylate and normal or isobutyl acrylate wherein the methyl methacrylate comprises from about 40 to about 75 wt. percent of the copolymer and the normal or isobutyl acrylate comprises from about 20 to about 50 wt. percent of the copolymer, and said methacrylate resin having a weight average molecular weight greater than about 100,000.

17. The article of claim 16 wherein said methacrylate resin has a weight average molecular weight of about 400,000.

18. The article of claim 16 wherein said polymeric surface comprises acrylonitrile-butadiene-styrene.

19. The article of claim 1 wherein said phthalate is an epoxy tallate.

* * * * *

UNITED STATES PATENT AND TRADEMARK OFFICE
CERTIFICATE OF CORRECTION

PATENT NO. : 4,074,014

DATED : February 14, 1978

INVENTOR(S) : Carl H. Wollen

It is certified that error appears in the above-identified patent and that said Letters Patent are hereby corrected as shown below:

In the Abstract, line 3:

"Mw" should be --$\overline{M}w$--

Column 1, line 68:

"Mw" should be --$\overline{M}w$--

Column 2, line 39:

"Mw" should be --$\overline{M}w$--

Column 2, line 43:

"Mw" should be --$\overline{M}w$--

Column 2, line 50:

"Mw" should be --$\overline{M}w$-- continued on page 2

UNITED STATES PATENT AND TRADEMARK OFFICE
CERTIFICATE OF CORRECTION

PATENT NO. : 4,074,014    Page 2 of 2

DATED : February 14, 1978

INVENTOR(S) : Carl H. Wollen

It is certified that error appears in the above-identified patent and that said Letters Patent are hereby corrected as shown below:

Column 2, line 57:

"Mw" should be --$\overline{M}w$--

Column 4, line 17:

"Mw" should be --$\overline{M}w$--

Signed and Sealed this

Seventeenth Day of October 1978

[SEAL]

Attest:

RUTH C. MASON
*Attesting Officer*

DONALD W. BANNER
*Commissioner of Patents and Trademarks*